United States Patent [19]
Ulrich

[11] 3,869,849
[45] Mar. 11, 1975

[54] GROUND ENGAGING HAY BALE ROLLING APPARATUS

[75] Inventor: James K. Ulrich, Vinton, Iowa

[73] Assignee: Starline, Inc., Harvard, Ill.

[22] Filed: Aug. 2, 1973

[21] Appl. No.: 384,954

[52] U.S. Cl. .............................................. 56/343
[51] Int. Cl. ............................................. A01d 39/00
[58] Field of Search ........................... 56/341–343, 56/16.4, 1, DIG. 2

[56] References Cited
UNITED STATES PATENTS
| | | | |
|---|---|---|---|
| 3,587,218 | 6/1971 | Geary | 56/343 |
| 3,751,890 | 8/1973 | Gay et al. | 56/341 X |

Primary Examiner—Louis G. Mancene
Assistant Examiner—J. N. Eskovitz
Attorney, Agent, or Firm—Wegner, Stellman, McCord, Wiles & Wood

[57] ABSTRACT

An apparatus which is moved along a swath of hay to roll it into spiral bales in contact with the ground has means for wrapping the bales with twine. A drive for a twine feed roller at the front of the apparatus is manually started to feed three generally parallel lays of twine onto the swath ahead of the forming bale, so the twine is wound into the outer convolutions of the bale. After a predetermined number of feed roller revolutions, corresponding to three revolutions of the bale, a spring loaded cutter bar is released to cut the twine and stop the roller drive. Release of the finished bale from the apparatus automatically resets the cutter bar.

12 Claims, 8 Drawing Figures

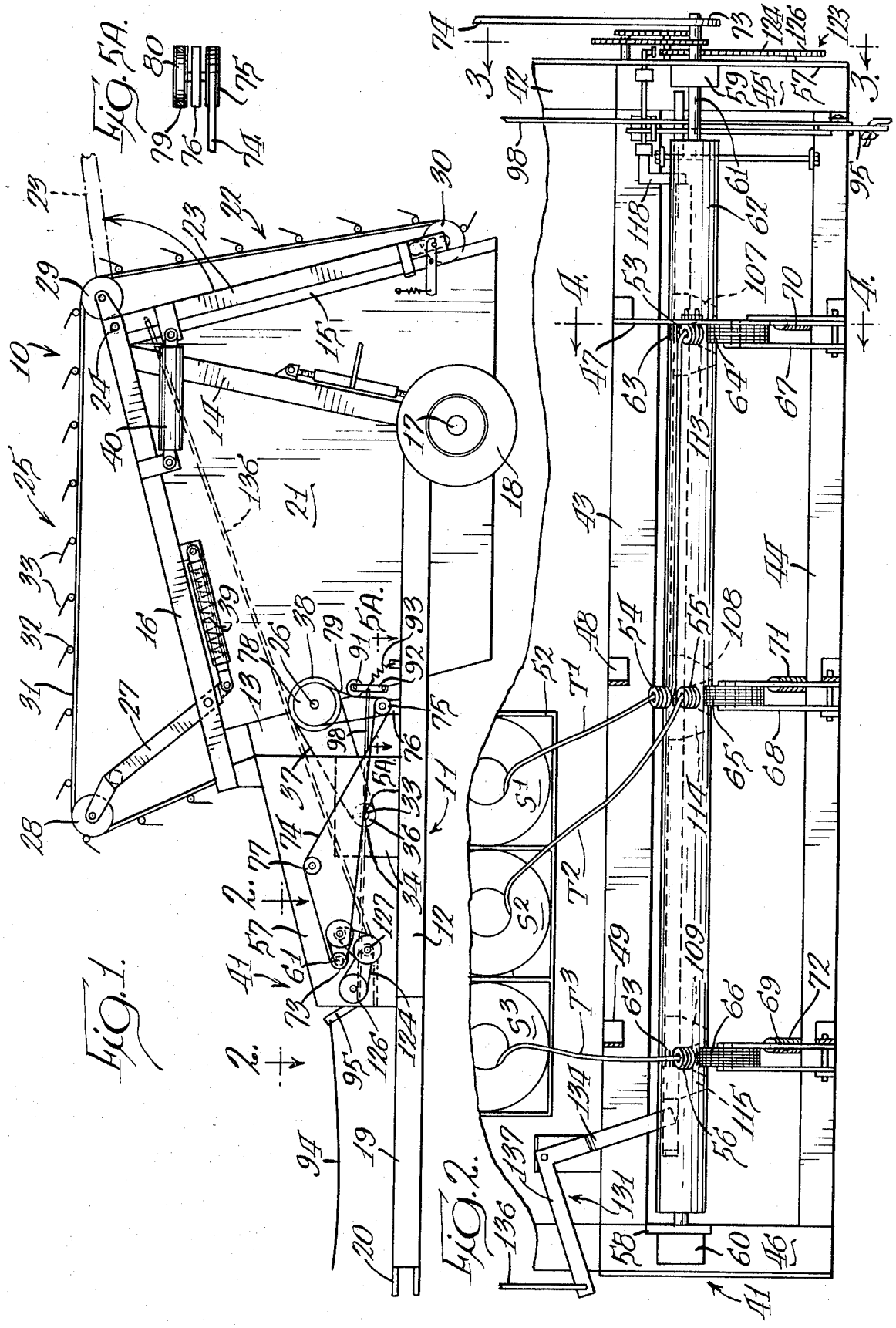

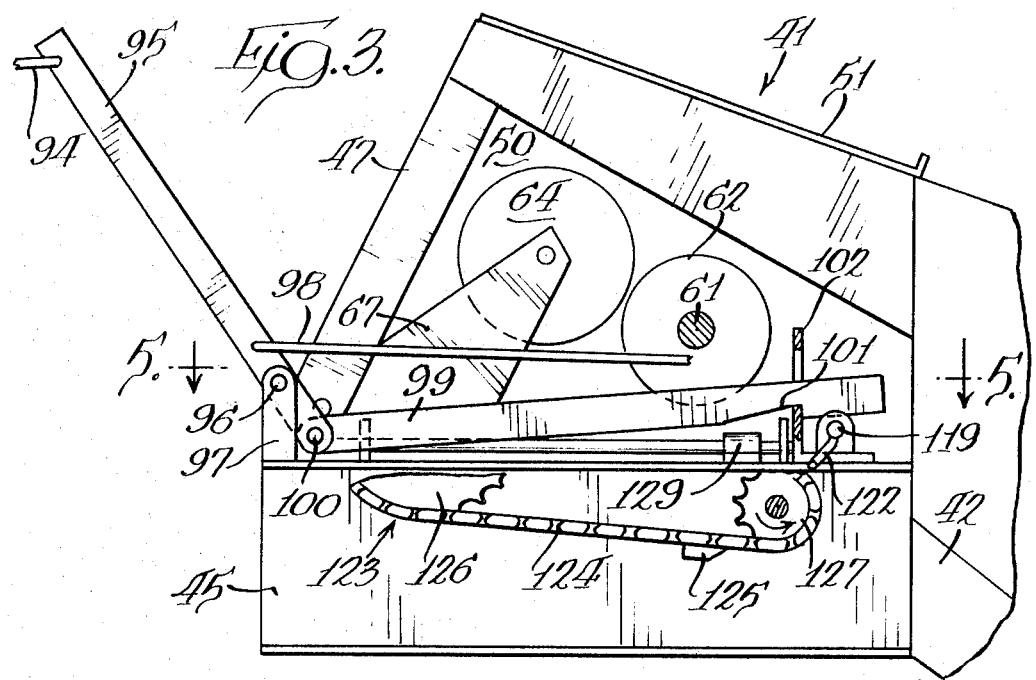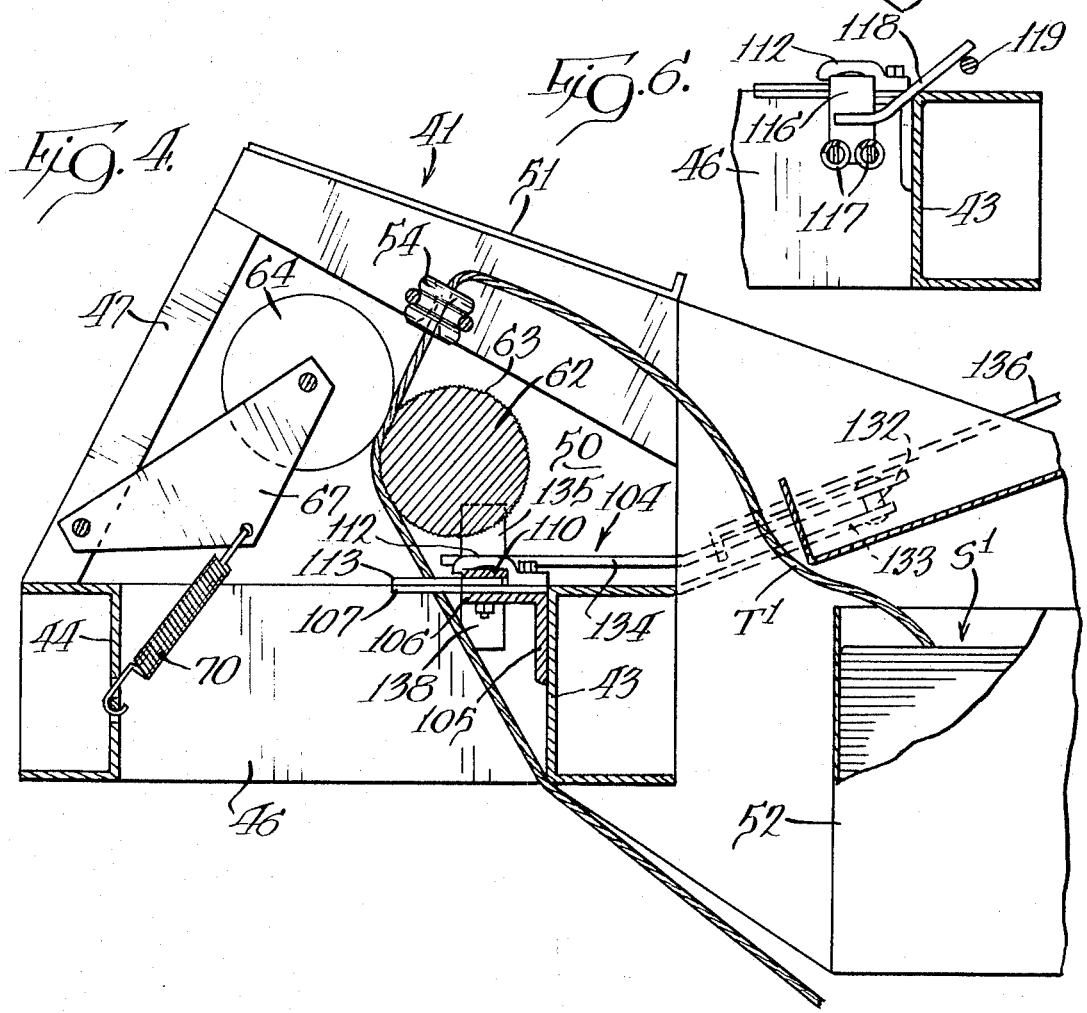

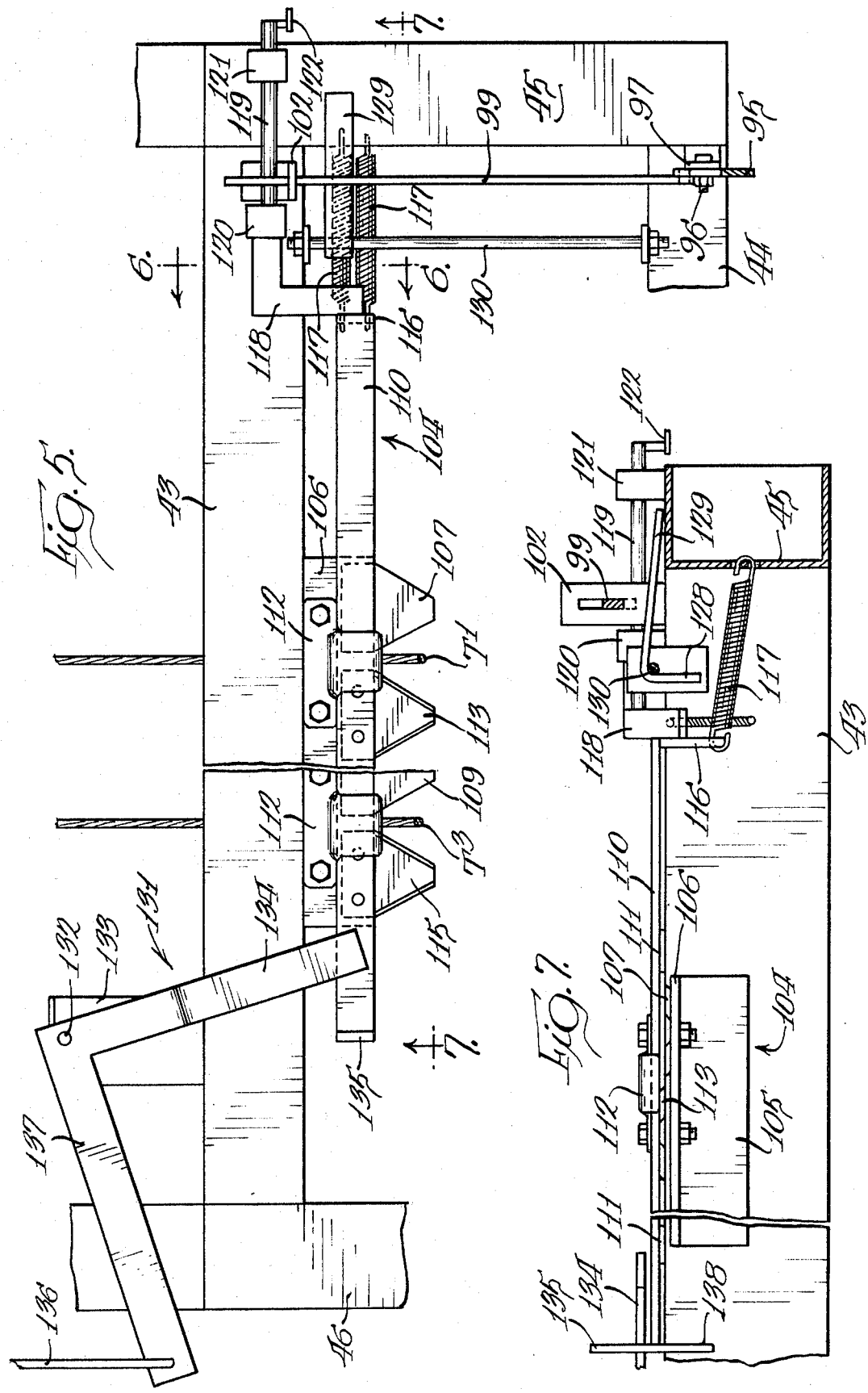

3,869,849

GROUND ENGAGING HAY BALE ROLLING APPARATUS

BACKGROUND OF THE INVENTION

Balers of the general type disclosed in Avery U. S. Pat. No. 3,110,145 provide a very efficient apparatus for rolling a swath of hay into spiral bales which may be left in the field like miniature haystacks or may be picked up by a power loader and stored in a barn. The word "hay" is used herein as a convenient generic term to include any field grown materials which may be rolled into bales for use in animal husbandry, including straw. Some such materials, and especially straw, do not form a bale which is readily handled unless they are wrapped with twine. Heretofore, there has been no apparatus for twine wrapping such bales, and this has created considerable resistance to the acceptance of such balers.

"Twine" is used herein as a generic term for commercial baler twine or for any other material which can be used as a substitute for it.

The apparatus of the present invention permits the practice of a novel method of wrapping twine about a spiral bale which is rolled directly from a swath of hay in contact with the ground.

SUMMARY OF THE INVENTION

The present invention is disclosed as applied to a commercial baler manufactured and sold by applicant's assignee which is made substantially in accordance with the disclosure of the allowed co-pending patent application of John W. Bliss and James E. Gay, Ser. No. 152,623, filed June 14, 1971, owned by applicant's assignee, on which the issue fee has been paid and which issued on Aug. 14, 1973 as U.S. Pat. No. 3,751,890. The present apparatus is an attachment for a baler, and permits the operator of the baler to carry out a novel method of wrapping a bale with twine as it is formed by the baler.

When a bale is about two revolutions from full size, the operator manually engages a twine feed drive which feeds three strands of twine in generally parallel lays on the line of, preferably on top of the swath of hay in front of the forming bale, so that the twine is wound into the outer convolutions of the bale. The lays of twine are sufficient for three revolutions of the forming bale; and when the bale is completed both ends of the lays of twine are under the bale so they need not be tied.

After the twine feed roller has made a predetermined number of revolutions, and thus has fed the required number of feet of twine, the twine is automatically cut and the feed of twine is simultaneously stopped. This is accomplished by releasing a spring loaded knife bar; and when the baling apparatus operates to release the fully formed bale from the baling chamber, it automatically resets the spring loaded knife bar for another cycle.

The twine feed roller is selectively driven by a belt drive from a sheave which is fixed to the main drive sprocket for the baler; and engagement of the twine feed roller drive is under the control of the operator. Release of the spring loaded knife bar is accomplished automatically by the operation of a release means for the knife bar stop which is driven by the feed roller drive.

Release of a bale from the baling chamber is accomplished by swinging a pair of rear sprocket arms upwardly and outwardly, and this motion of the arms acts through a linkage to reset the spring loaded knife bar.

THE DRAWINGS

FIG. 1 is a side elevational view of a baler supplied with the apparatus of the invention, the arms for releasing a finished bale being illustrated in solid lines in baling position and in broken lines in release position;

FIG. 2 is a fragmentary plan view on an enlarged scale taken substantially as indicated along the line 2—2 of FIG. 1;

FIG. 3 is a fragmentary longitudinal sectional view on an enlarged scale taken substantially as indicated along the line 3—3 of FIG. 2;

FIG. 4 is a fragmentary sectional view on an enlarged scale taken substantially as indicated along the line 4—4 of FIG. 2;

FIG. 5 is a fragmentary plan sectional view taken substantially as indicated along the line 5—5 of FIG. 3;

FIG. 5A is a fragmentary sectional view on an enlarged scale taken along the line 5A—5A of FIG. 1;

FIG. 6 is a fragmentary sectional view taken substantially as indicated along the line 6—6 of FIG. 5; and FIG. 7 is a fragmentary sectional view taken substantially as indicated along the line 7—7 of FIG. 5.

DETAILED DESCRIPTION OF THE INVENTION

Referring to the drawings in greater detail, and referring first to FIG. 1, a baler, indicated generally at 10, has a frame, indicated generally at 11, which includes side beams 12, front frame uprights 13, intermediate frame uprights 14, rear frame uprights 15, top frames 16, and an axle 17 for supporting wheels 18. A draft tongue 19 has a bifurcated forward end 20 to receive a pintle (not shown) for attachment of the draft tongue to the draw bar of a farm tractor. The frame also includes side plates 21 which define the sides of a baling chamber the rear of which is closed by a gate assembly, indicated generally at 22, which includes side arms 23 that are pivoted at 24 and connected by cross members (not shown) adjacent their upper and lower ends.

Baling apparatus, indicated generally at 25, includes a drive shaft 26 which is provided between the side plates 21 with sprockets (not shown); pivoted front arms 27 on which are journalled sprockets 28 that are aligned with the sprockets on the drive shafts 26; upper rear sprockets 29 which are mounted at the upper end of the gate assembly 22 in alignment with the front upper sprockets 28; lower rear sprockets 30 which are mounted at the bottom of the gate assembly 22, also in line with the sprockets 28 and 29; and continuous baling chains 31 which are trained over the aforesaid sprockets and provided with raddles 32 having tines 33.

Hydraulic drive and control means is mounted in a cabinet 34 at the front of the frame 11, and includes generally a hydraulic fluid tank, a hydraulic motor, valves for controlling the operation of the motor and of the means for opening and closing the gate 22 as will be described hereinafter, and means for connecting the hydraulic system to that of a farm tractor. A drive shaft 35 which extends through a wall of the cabinet 34 carries a drive sprocket 36; and a drive chain 37 is trained around the sprocket 36 and around a sprocket 38 on the shaft 36 of the baling mechanism 25. Starting and stopping of the hydraulic motor for driving the baling means 25 is preferably manually performed by means of a control cord (not shown) which extends from a valve control handle in the cabinet 34 forwardly to a position which is accessible to an operator on a tractor.

The hydraulic system of the allowed co-pending application, heretofore referred to, is capable of functioning to operate the baler as herein described, so the operator can carry out the method of the present application.

As described in Avery U.S. Pat. No. 3,110,145, heretofore referred to, the baling chains 31 include a bottom run which extends from the lower rear sprockets 30 to the sprockets on the drive shaft 26, and that run of the baling chains contacts the hay in a swath to roll it forwardly on itself and thus form a spiral bale as the baler 10 moves forwardly along the swath. As the bale increases in size, the lower run of the baling chains arches upwardly, and this action is permitted by the pivoted arms 27 which swing rearwardly against the biasing force provided by compression spring assemblies 39 that are adjustable to vary the force required to swing the arms 27 and thus vary the pressure applied to the bale and the tightness, or firmness, of the bale.

When a bale is completed the gate 22 is swung upwardly and rearwardly to the broken line position of FIG. 1 by means of hydraulic cylinder and piston units 40 at the two sides of the frame, so that the baler may be moved forward and leave the finished bale behind.

The baler as heretofore described is the basic structure for which the twine apparatus, indicated generally at 41, is an attachment. Referring now to FIGS. 2 to 7, and particularly to FIG. 3, a pair of inclined side supports 42 are welded to the baler frame side beams 12 and supports a twine mechanism frame that includes a rear cross channel 43, a front cross channel 44, and side channels 45 and 46. Intermediate brackets 47, 48 and 49 provide support for various components of the twine apparatus. A fixed hood 50 and a movable hood 51 are supported on the brackets 47 and, in part, upon the side beams 45 and 46.

Mounted on the baler frame alongside the hydraulic motor and control cabinet 34 is a twine supply box 52 which is divided into three compartments containing spools S1, S2 and S3 of twine from which strands of twine T1, T2 and T3 are guided into parallel positions spaced across the apparatus. Guide eyes 53 and 54 mounted, respectively, upon the brackets 47 and 48 by means of U bolts serve to guide the strand T1 to a position adjacent one side of the apparatus; while a guide eye 55, also on the bracket 48, guides the strand T2 to a position generally in the longitudinal median plane of the apparatus; and a guide eye 56 mounted on the bracket 49 guides the strand T3 to a location adjacent the opposite side of the apparatus.

A side plate 57 on the frame channel 45 and a bracket 58 on the frame channel 46 carry, respectively, a hollow bearing assembly 59 and a thrust bearing assembly 60 for a shaft 61 of a twine feed roller 62 which is best seen in FIG. 4 to be positioned immediately below the twine guide eyes 54, 55 and 56. In line with each of the twine guide eyes the feed roller 62 is provided with a twine engaging area 63 consisting of shallow, rounded teeth which may feed the twine without cutting it. Cooperating with the roller 62 are three twine clamping wheels 64, 65 and 66 which are mounted, respectively, upon pivoted arms 67, 68 and 69; and tension springs 70, 71 and 72 bias the arms downwardly to maintain the wheels 64, 65 and 66 in feeding engagement with the twine strands T1, T2 and T3, respectively.

The end of the twine feed roller shaft 61 which is supported in the bearing assembly 59 extends through the side plate 57 and has a sheave 73 fixed on its outer end; and a drive belt 74 for the twine feed roller 62 is trained around the sheave 73, around an input sheave 75 which is keyed to a shaft journalled in a bracket 76 below the baler drive shaft 26, and around an adjustable tensioning sheave 77. Drive for the belt 74 is afforded by a sheave 78 which is mounted on the baler sprocket 38 and a belt 79 which is trained around the sheave 78 and around a sheave 80 which is keyed to the same shaft as is the sheave 75. The belt 79 hangs loosely around the sheaves 78 and 80, so that it does not ordinarily transmit power to the twine feed roller 62. In the position illustrated in FIG. 1, however, the belt 79 is tensioned to drive the twine feed roller 62 by means of a clutch sheave 91 which is carried upon a pivoted arm 92 that is urged in a clockwise direction as viewed in FIG. 1 by a tension spring 93. The arm 92 and its clutch sheave 91 must be manually shifted to the drive position of FIG. 1 by the operator on the tractor who pulls on a lanyard 94 which is connected to the upper end of a lever 95 that is provided at 96 on a bracket 97 at the front of the twine apparatus. A tie rod 98 which is connected to the lever 95 above its pivot 96 is also seen in FIG. 1 to be connected to the arm 92 for the clutch pulley 91 so that movement of the lever 95 to the position illustrated in FIG. 3 swings the arm 92 counterclockwise to engage the clutch sheave 91 with the drive belt 79. A drive latch bar 99 is pivotally connected at 100 to the lower end of the drive control lever 95 and has a notch 101 which engages a slotted latch plate 102, as seen in FIG. 3, to retain the clutch sheave 91 in driving engagement with the drive belt 79.

Referring now particularly to FIGS. 4 to 7, the twine apparatus also includes twine cutting means, indicated generally at 104, that is best in FIG. 4 to include an angle member 105 which extends substantially across the entire front of the rear frame channel 43 and has a horizontal web 106 forming a fixed knife bar for fixed knives 107 and 108 and 109 which are immediately adjacent the twine strands T1, T2 and T3, respectively. A movable knife bar 110 rides on the fixed knife bar 106 on pads 111 and is held in place by hook-shaped brackets 112. The movable knife bar 110 carries knives 113, 114 and 115 which are in shearing relationship, respectively, with the fixed knives 107, 108 and 109. Conveniently all of the knives are mower sickle sections which are readily sharpened and always available for replacement in the event of breakage or wear. As seen in FIG. 5, the movable knives are a sufficient distance from the paths of the twine strands T1, T2 and T3 that the latter may move freely without rubbing against the sharp edges of the knives.

The end of the movable knife bar 110 which is toward the side plate 57 has a depending end plate 116, and a pair of tension springs 117 connect the end plate to the upright web of the frame side channel 45. Thus, the movable knife bar 110 is constantly biased to the right as seen in the drawings, and thus must be retained in the position illustrated in the drawings by a stop 118 against which the end plate 116 bears. The stop 118 is best seen in FIGS. 5 and 7 to be mounted on a rock shaft 119 which is pivoted in bushings 120 and 121 that surmount the frame channels 43 and 45. On the end of the rock shaft 119 opposite the stop 118 is a crank arm 122 (FIGS. 3, 5 and 7). Clockwise movement of the crank arm 122 as seen in FIG. 3 elevates the knife stop 118 to release the movable knife bar 110 so that it may cut the twine strands T1, T2 and T3.

The knife stop 118 is moved to release the movable knife bar 110 after the twine feed roller 62 has completed a predetermined number of revolutions in a twine feeding operation, and this is accomplished by the means which is about to be described.

A stepdown drive, indicated generally at 123, drives a stop actuating chain 124 on which there is a stop lug 125. The stop chain 124 is trained around a sprocket 126 and around a sprocket 127; and the stepdown gearing provided by the sprockets and chains which are seen in FIGS. 1 and 2 causes the stop actuating chain 124 to make one complete circuit while the twine feed roller 62 rotates a sufficient number of times to lay approximately 60 feet of twine. The stepdown power transmission system is not described in detail, nor are all of the sprockets and chains numbered due to lack of space; but the necessary sprocket dimensions to achieve any desired rate of travel of the chain 124 in relationship to the rate of rotation of the twine feed roller 62 may be readily calculated.

When the stop actuating lug 125 on the chain 124 contacts the crank arm 122 (FIG. 3) it moves the crank arm clockwise to elevate the knife bar stop 118 and release the movable knife bar 110 to cut the twine. At the same time, as best seen in FIGS. 5 and 7, the end of the knife bar strikes a downturned arm 128 of a latch release member 129 which is pivotally mounted on a bar 130 and extends beneath the drive latch bar 99. As is clearly apparent from FIGS. 3, 5 and 7, lifting the arm 129 raises the latch bar 99 to disengage the notch 101 from the bracket 102, thus permitting the tension spring 93 to swing the clutch sheave arm 92 clockwise and thus terminate the drive of the twine roller 62.

The movable knife bar 110 is automatically reset for another twine feeding cycle when the gate 22 is swung up to release a finished bale from the chamber. In order to accomplish this, a bell crank, indicated generally at 131, is pivoted at 132 on a bracket 133 which projects rearwardly from the rear frame channel 43. The bell crank 131 has a first arm 134 which overlies the movable knife bar 110 so that, when the bell crank 131 is rotated clockwise as viewed in FIG. 5 the bell crank arm 134 contacts an upstanding end plate 135 on the end of the movable knife bar to move the knife bar to the left as viewed in FIG. 5 against the tension of the spring 117; and as soon as the opposite end of the knife is past the stop 118, the stop pivots downwardly by gravity to the position illustrated in the drawings. Clockwise movement of the bell crank 131 is caused by the rearward and upward swinging movement of the gate 22 which is transmitted to the bell crank 131 by a tie rod 136 that is connected to the second arm 137 of the bell crank.

As seen in FIG. 7, the end of the knife bar 110 which has the upstanding end member 135 also has a downwardly extending end member 138 which stops the cutting movement of the knife bar by abutment with the adjacent end of the fixed knife bar 106.

Operation of the apparatus to perform the method of the present invention is believed to be obvious from the foregoing description. During a baling operation the baling means 25 is driven to roll a bale; and when the operator observes that the bale is about two turns less than full size, he pulls the lanyard 94 to pivot the lever 95 forwardly to the position of FIG. 3 and engage the clutch sheave 91 as seen in FIG. 1. This drives the knife feed roller 62 to feed the twine strands T1, T2 and T3 and put three substantially parallel lays of twine along the top of the swath where they are wound into the outer convolutions of the bale.

The operation of the twine feed mechanism is so related to the diameter of a full size bale that both end portions of the lays of twine which are wrapped around the bale are under the bale when it is released from the baler. Thus typing of the twine is not necessary.

The first end portion of the twine, when it is caught up in the rolling bale, is necessarily under the bale. The twine cutting means is released just as the baling mechanism completes three revolutions measured from the start of the twine feed. Thus, the twine cutting operation signals the operator that he should release the bale, which also stops the baling mechanism; and the end portions of the twine over lap beneath the bale.

This requires for a bale six feet in diameter that approximately 60 feet of twine be fed from each of the three spools S1, S2 and S3; and after the number of revolutions of the twine feed cylinder 62 required for this purpose the stop actuating chain 124 has made one complete circuit to bring the stop control lug 125 against the crank arm 122 to elevate the knife bar stop 118 and release the knife bar to cut the twine and stop the twine feed as heretofore described.

The bale then being completed, the baling means 25 is stopped and at the same time hydraulic fluid is admitted to the cylinder and piston units 40 to raise the gate 22 for release of the bale. This automatically resets the movable knife bar for another baling cycle as heretofore described.

The foregoing detailed description is given for clearness of understanding only and no unnecessary limitations should be understood therefrom, as modifications will be obvious to those skilled in the art.

I claim:

1. A method of forming a hay bale which is wrapped with twine which comprises the steps of:
   advancing along a swath of hay while compressing and rolling said swath in contact with the ground to form a spiral bale;
   providing a supply of twine;
   beginning to feed at least one strand of twine from said supply to lay said strand along the line of the swath immediately forward of the forming bale when the latter is substantially a predetermined size which is a few convolutions less than its full size;
   continuing to roll said bale and lay said strand until the bale reaches its full size, so that said strand is wound only in the outer convolutions of the bale;
   substantially simultaneously cutting the strand of twine and terminating the feed of twine from the supply when the length of the lay of twine is such that its two end portions over lap beneath the bale; and immediately thereafter stopping the rolling of said swath.

2. The method of claim 1 in which the supply of twine includes a plurality of separate spools of twine, in which twine is fed simultaneously and at equal speed from each of said plurality of spools to provide a plurality of effectively parallel lays of twine, and in which said plurality of lays of twine are cut substantially simultaneously.

3. Apparatus for rolling a swath of hay into a twine wrapped bale in contact with the ground comprising, in combination:
- a wheeled frame defining a baling chamber;
- driven means mounted on said frame in association with said baling chamber for contacting hay in a swath and compressing and rolling the hay forwardly on itself to form a spiral bale as the apparatus moves forwardly along the swath, said driven means being operable independently of the movement of the apparatus;
- a twine supply, supported in the frame;
- twine feeding roller means journalled at the front of the frame;
- means for driving said roller means to feed a strand of twine from said supply and to lay said strand along the line of the swath immediately forward of the forming bale as the apparatus moves forwardly, whereby said strand may be wound in the convolutions of the bale;
- means for controlling the operation of said roller driving means to initiate the feeding of said strand of twine during the bale forming operation;
- means operable to cut the twine and to substantially simultaneously terminate the feeding of twine;
- and means for releasing a bale from the chamber.

4. The apparatus of claim 3 in which the roller driving means includes a member which is integral with a part of the driven means, and the means for controlling the operation of the roller driving means comprises means for selectively drivingly connecting said member with the roller.

5. The apparatus of claim 4 in which the means for selectively drivingly connecting the member with the roller includes a manual actuating member.

6. The apparatus of claim 4 which includes a drive latch which is engaged to maintain the driving connection between the member and the roller, and in which the means operable to cut the twine includes a movable element which disengages the latch.

7. The apparatus of claim 6 in which the means operable to cut the twine comprises a fixed element, a first blade on said fixed element, and a second blade on the movable element which is in shearing relationship with said first blade, and in which the twine is fed between said blades.

8. The apparatus of claim 7 which includes spring means constantly biasing the movable element in a shearing direction, a knife latch engaged with said movable element to retain it in a cocked position against the bias of said spring means, and knife release means associated with the roller driving means for disengaging the knife latch after a predetermined number of revolutions of the roller means.

9. The apparatus of claim 8 which includes means operably associated with the bale release means for driving the movable element to cocked position against the bias of the spring means, and means biasing the knife latch into engagement with said movable element.

10. The apparatus of claim 8 in which the knife release means includes a driven member which is driven by the roller driving means to make one revolution while the roller means makes said predetermined number of revolutions, an actuating element on said driven member, and a lever which is moved by said actuating element to disengage the knife latch.

11. The apparatus of claim 3 in which the twine supply consists of at least three spools of twine, a twine guiding means is provided to guide a strand from each of said spools and to lay said strands generally parallel to one another, the twine cutting means includes a fixed cross bar, a blade on said fixed cross bar corresponding to each strand, a movable cross bar, a blade on said movable cross bar which is operatively associated in shearing relationship with each blade on the fixed cross bar, and each twine guiding means guides a strand between a first blade and a second blade.

12. The apparatus of claim 3 in which the means operable to cut the twine comprises a fixed element, a first blade on said fixed element, and a second blade on the movable element which is in shearing relationship with said first blade, and in which the twine is fed between said blades.

* * * * *